United States Patent
Khan (10) Patent No.: US 10,264,414 B2
(45) Date of Patent: *Apr. 16, 2019

(54) ASYNCHRONOUS COMMUNICATION DEVICE FOR PROVIDING WIRELESS BROADBAND LINK BETWEEN BASE STATION AND PLURALITY OF CLIENT DEVICES

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,807

(22) Filed: Nov. 21, 2016

(65) Prior Publication Data

US 2018/0146350 A1 May 24, 2018

(51) Int. Cl.
*H04W 4/20* (2018.01)
*H04W 88/02* (2009.01)
*H04W 88/08* (2009.01)

(52) U.S. Cl.
CPC .............. *H04W 4/20* (2013.01); *H04W 88/02* (2013.01); *H04W 88/08* (2013.01)

(58) Field of Classification Search
CPC ........................ H01S 3/0078; H04L 27/0006
See application file for complete search history.

(56) References Cited

U.S. PATENT DOCUMENTS

| | | | | |
|---|---|---|---|---|
| 2012/0269142 | A1* | 10/2012 | Porat | H04W 72/1231 370/329 |
| 2015/0092676 | A1* | 4/2015 | Periyalwar | H04W 4/029 370/329 |
| 2015/0180134 | A1* | 6/2015 | Boutigny | H01Q 19/062 343/755 |
| 2016/0095108 | A1* | 3/2016 | Ryoo | H04L 5/0007 370/329 |

* cited by examiner

*Primary Examiner* — Ayaz R Sheikh
*Assistant Examiner* — Debebe A Asefa
(74) *Attorney, Agent, or Firm* — Michael A. Rahman (57) ABSTRACT

An asynchronous communication device provides wireless broadband link between a base station and a plurality of client devices in a wireless communication network. The asynchronous communication device includes a receiver configured to operate at a first frequency band and to asynchronously receive first and second data packets from the base station. The device includes a transceiver configured to operate at a second frequency band and operable to asynchronously transmit the first data packets to a first client device and to transmit the second data packets to a second client device. The first frequency band has a wide band separation from the second frequency band. The transceiver is configured to asynchronously receive third and fourth data packets from the first and second client devices, respectively. The transceiver asynchronously transmits the third and fourth data packets at the second frequency band to the base station.

30 Claims, 9 Drawing Sheets

ASYNCHRONOUS COMMUNICATION DEVICE FOR PROVIDING WIRELESS BROADBAND LINK BETWEEN BASE STATION AND PLURALITY OF CLIENT DEVICES

TECHNICAL FIELD

This application relates generally to wireless communications, and more specifically to an asynchronous communication device that provides wireless broadband link between a base station and a plurality of client devices.

BACKGROUND

Current wireless communication systems are based on two popular standards: a wide area network (WAN) standard referred to as the Fourth Generation Long Terra Evolution (4G LTE); and a local area network (LAN) standard called Wi-Fi. Wi-Fi operates on shared or unlicensed spectrum as short-range wireless extension of wired broadband systems. The 4G LTE on the other hand provides wide area long-range connectivity using licensed spectrum and dedicated infrastructure such as cell towers and backhauls to connect to the Internet.

As more people connect to the Internet, increasingly chat to friends and family, watch videos, listen to streamed music, and indulge in virtual or augmented reality experience, data traffic continues to grow at unprecedented rates. In order to address the continuously growing wireless capacity need, the next generation LAN and WAN systems are expected to use higher frequencies referred to as millimeter wave spectrum shown in Table 1.

TABLE 1

Examples of millimeter wave bands

| Bands [GHz] | Frequency [GHz] | Bandwidth [GHz] |
| --- | --- | --- |
| 24 GHz | 24.25-24.45 | 0.200 |
|  | 24.75-25.25 | 0.500 |
| 28 GHz/LMDS | 27.5-28.35 | 0.850 |
|  | 29.1-29.25 | 0.150 |
|  | 31-31.3 | 0.300 |
| 32 GHz | 31.8-33 | 1.200 |
| 37 GHz | 37.0-38.6 | 1.600 |
| 39 GHz | 38.6-40 | 1.400 |
| 42 GHz | 42.0-42.5 | 0.500 |
| 47 GHz | 47.2-50.2 | 3.000 |
| 50 GHz | 50.4-52.6 | 1.200 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Figure 1:
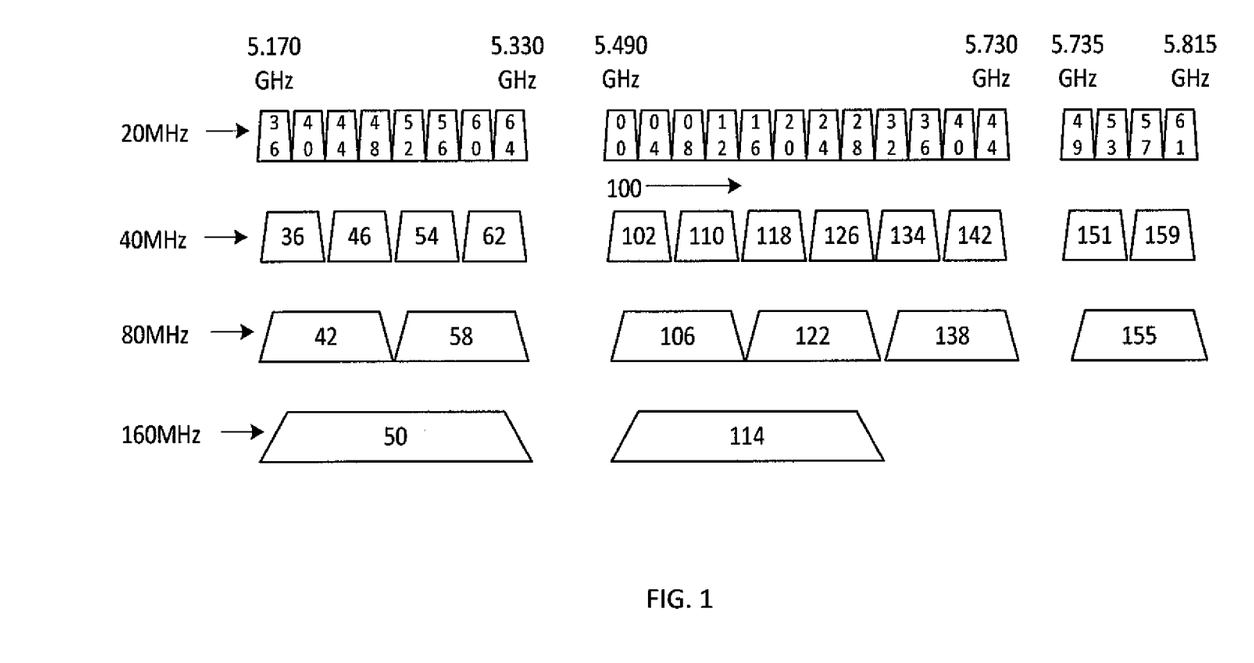
FIG. 1 illustrates the spectrum of 5 GHz unlicensed band.

The two most commonly used unlicensed frequency bands below 6 GHz are the 2.4 GHz band and the 5 GHz band. The 5 GHz unlicensed band offers many hundreds of megahertz (MHz) spectrum as illustrated in FIG. 1. The 2.4 GHz and 5 GHz unlicensed bands are generally used by the local area network (LAN) standard called Wi-Fi. The 4G LTE cellular systems generally use licensed bands below 6 GHz.

Current 4G LTE and LAN networks that utilize time division duplex (TDD) suffer from numerous drawbacks. Since downlink (DL) and uplink (UL) use the same frequency band in TDD-based 4G LTE and LAN, DL signals transmitted by a base station or an access point at high power interfere with UL signals transmitted by client devices at low power to another base station. Similarly, the signals transmitted from one client device connected to a base station will interfere with the signals received by another client device connected to another base station. Consequently, transmitters and receivers must be synchronized so that UL and DL data packets are transmitted in respective time slots to avoid interference. Thus, a client device (e.g., mobile phone) must wait for a UL time slot before commencing UL transmission. Similarly, a base station or access point must wait for a DL time slot before the base station or access point may commence DL transmission. As a result, delay is caused in UL and DL transmissions. Also, hardware including synchronization circuits are necessary to synchronize the client device with the base station or access point, which increases overcall cost of the systems. Furthermore, if the data packets transmitted by a client device or a base station only partially fills the time slots due to the size of the data packets, transmission throughput is reduced because of unfilled or wasted time slots.

In 4G LTE and LAN networks that utilize frequency division duplex (FDD), transmitters and receivers can operate asynchronously because UL and DL frequencies are different. However, because UL and DL frequencies are not widely separated, the transmitter's output may overload the receiver's input. Consequently, transmitters and receivers require high-complexity multi-pole filters to provide significant attenuation to prevent the transmitter's output from overloading the receiver's input.

SUMMARY

According to disclosed embodiments, an asynchronous communication device provides wireless broadband link between a base station and a plurality of client devices in a wireless communication network.

In one aspect, the asynchronous communication device includes a receiver configured to operate at a first frequency band and to asynchronously receive first and second data packets from the base station. The communication device also includes a transceiver configured to operate at a second frequency band and operable to asynchronously transmit the first data packets to a first client device and to transmit the second data packets to a second client device. The first frequency band has a wide band separation from the second frequency band. The transceiver is configured to asynchronously receive third and fourth data packets from the first and second client devices, respectively. The transceiver is operable to asynchronously transmit the third and fourth data packets at the second frequency band to the base station.

According to disclosed embodiments, the wide band separation is at least 10 GHz. According to other disclosed embodiments, the wideband separation is at least 2 GHz.

According to some disclosed embodiments, the first frequency band is in a millimeter wave band, and the second frequency band is in an unlicensed shared band.

According to some disclosed embodiments, the receiver comprises a first antenna array configured to receive signals at a millimeter wave band. The transceiver comprises a second antenna array configured to receive and transmit signals at the unlicensed shared band.

According to disclosed embodiments, the asynchronous communication device includes a medium access control (MAC) configured to format the data packets to interface with a physical layer and to provide channel access control protocols to enable the data packets to be delivered to their respective intended destinations. The physical layer is configured to process the data packets to generate digital baseband In-Phase (I) and Quadrature (Q) signals.

According to disclosed embodiments, the transceiver includes a plurality of digital to analog converters configured to convert the digital baseband in-phase (I) and quadrature (Q) signals to analog baseband in-phase (I) and quadrature (Q) signals. The transceiver includes a plurality of quadrature modulators driven by a local oscillator, wherein the modulators are configured to modulate the analog baseband In-Phase (I) and Quadrature (Q) signals. The transceiver includes a plurality of transmit amplifiers operable to amplify the modulated analog baseband in-phase (I) and quadrature (Q) signals. The amplified signals are transmitted by the second antenna array.

According to some disclosed embodiments, the receiver includes a plurality of receive amplifiers operable to amplify the received signals, and includes a plurality of quadrature modulators driven by a local oscillator, wherein the modulators are configured to modulate the amplified signals and to generate analog baseband In-Phase (I) and Quadrature (Q) signals. The receiver includes a plurality of analog to digital converters configured to convert the analog baseband in-phase (I) and quadrature (Q) signals to digital baseband in-phase (I) and quadrature (Q) signals, wherein the digital baseband in-phase (I) and quadrature (Q) signals are applied to the physical layer for digital signal processing.

According to disclosed embodiments, a method of providing wireless broadband link between a base station and a plurality of client devices in a wireless communication network includes receiving asynchronously by a communication device at a first frequency band first and second data packets from the base station. The method includes transmitting asynchronously by the communication device at a second frequency band the first data packets to a first client device and the second data packets to a second client device. The first and second frequency band has a wide band separation. The method includes receiving asynchronously by the communication device at the second frequency band third and fourth data packets from the first and second client devices, respectively, and transmitting asynchronously by the communication device the third and fourth data packets at the second frequency band to the base station.

DETAILED DESCRIPTION AND BEST MODE OF IMPLEMENTATION

Figure 2:
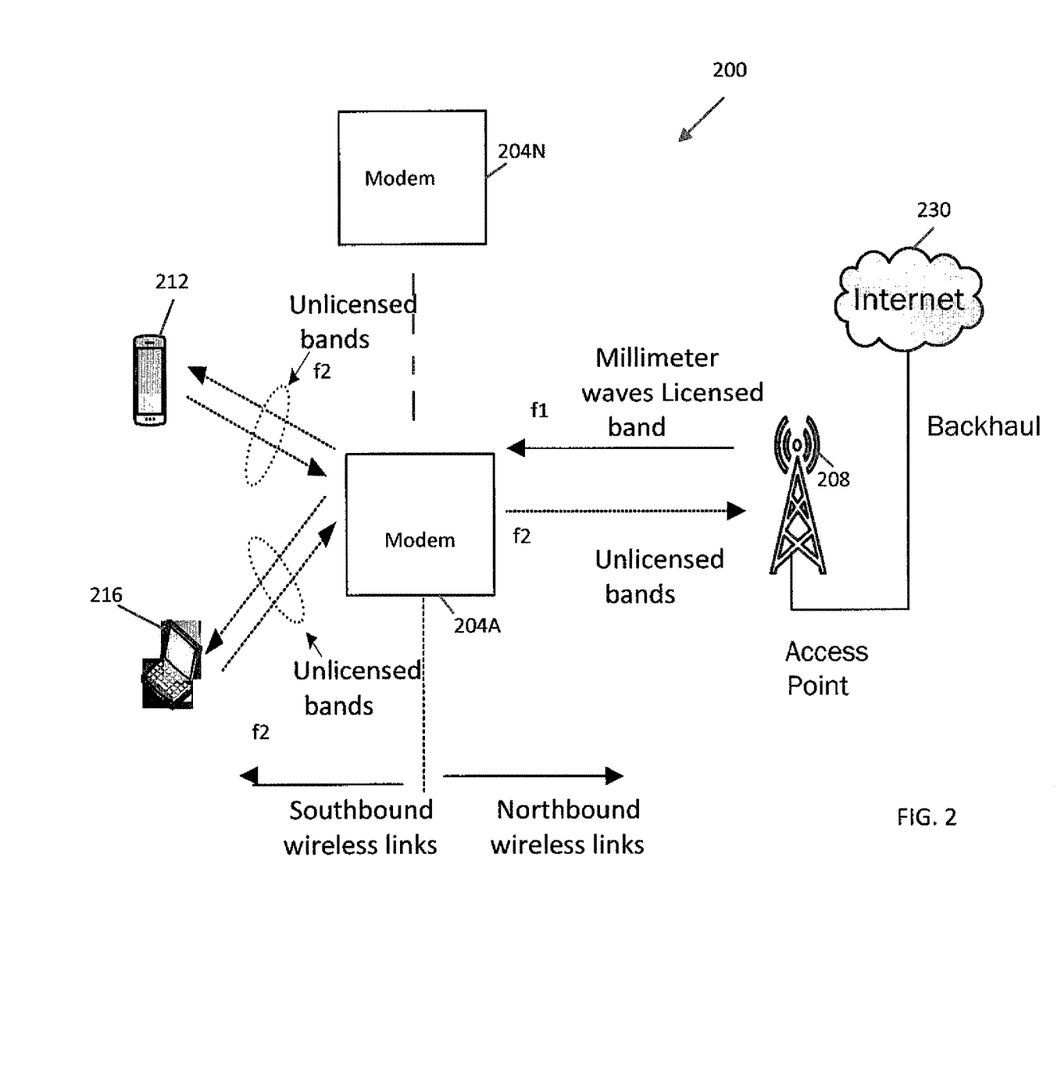
FIG. 2 illustrates a wireless network in accordance with disclosed embodiments.

FIG. 2 illustrates an exemplary wireless network 200 in accordance with disclosed embodiments. Network 200 includes a plurality of asynchronous wireless broadband modems 204A-204N that communicate with access point or base station 208. Access point 208 is connected to the Internet 230 via high-speed wired link 234 such as, for example, an optical fiber link having Gigabit/s capacity. Although FIG. 2 illustrates only one access point (i.e., access point 208), network 200 includes a plurality of access points connected to the Internet 230 via high-speed wired links.

Referring to FIG. 2, asynchronous wireless broadband modem 204A communicates with a plurality of communication devices (e.g., mobile phones, laptop computers). For example, modem 204A communicates with communication devices 212 and 216. Modem 204A receives data from access point 208 at frequency $f_1$ in a licensed millimeter wave spectrum. The licensed millimeter wave spectrum may, for example, be the 28 GHz, 37 GHz, or 39 GHz band. Modem 204A transmits data to access point 208 at frequency $f_2$ in an unlicensed shared spectrum. The unlicensed shared spectrum may, for example, be the 2.4 GHz, 3.5 GHz, 5 GHz or 60 GHz band. Modem 204A transmits data to communication devices 212 and 216 at frequency $f_2$ in an unlicensed shared spectrum and receives data from communication devices 212 and 216 at frequency $f_2$. Thus, the millimeter wave licensed band signals (i.e., downlink signals) are transmitted by access point 208 which has a large form factor and operates at high power, and the unlicensed shared band signals (downlink and uplink signals) are transmitted by modem 204A and communication devices 212 and 216 which have a small form factor and operates at low power. The uplink and downlink between modem 204A and access point 208 are referred to herein as northbound wireless links, and the uplink and downlink between modem 204A and communication devices 212 and 216 are referred to herein as southbound wireless links.

As discussed before, modem 204A receives data from access point 208 at frequency $f_1$ in a licensed millimeter wave spectrum (e.g., 28 GHz, 37 GHz, or 39 GHz band), and transmits data to access point 208 at frequency $f_2$ in an unlicensed shared spectrum (e.g., 2.4 GHz, 3.5 GHz, 5 GHz or 60 GHz band). Since, there are wide band separations between the licensed millimeter wave bands and the unlicensed shared bands, modem 204A can operate asynchronously to communicate with access point 208 and communication devices 212 and 216. Consequently, UL and DL data packets can be transmitted asynchronously without interference. Thus, a communication device (e.g., mobile phone) need not wait for a UL time slot before commencing UL transmission. Similarly, a base station or access point need not wait for a DL time slot before the base station or access point may commence DL transmission. As a result, delay typically associated with UL and DL transmissions in current 4G LTE and LAN networks is reduced. Also, transmission throughput is improved because there are no unfilled or wasted time slots.

According to the principles of the invention, modem 204A acts as a hub aggregating data from communication devices 212 and 216 using the unlicensed shared spectrum.

The aggregated data is transferred by modem 204A to access point 208 on the northbound link using the unlicensed shared spectrum. Access point 208 serves as a hub aggregating data transmitted by multiple modems. In the reverse direction, modem 204A receives data from access point on the northbound wireless link which relies on the licensed millimeter wave spectrum and routes the received data to communication devices on the southbound wireless link which relies on the unlicensed shared spectrum.

Figure 3:
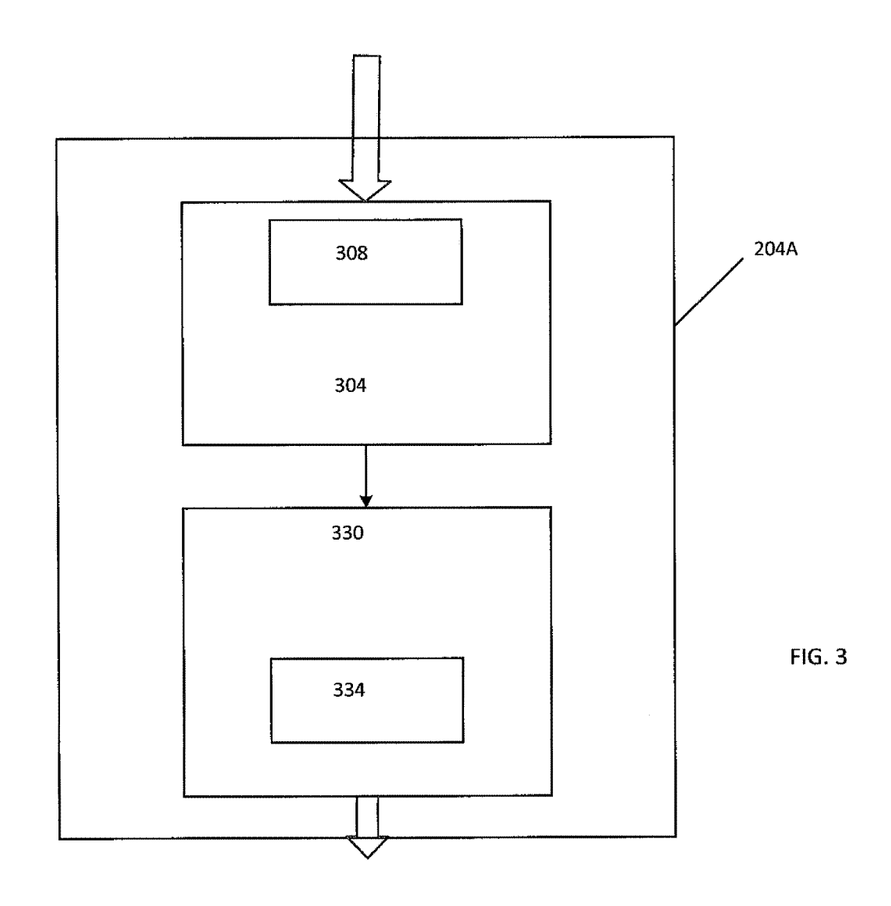
FIG. 3 illustrates a modem in accordance with disclosed embodiments.

FIG. 3 illustrates modem 204A in accordance with disclosed embodiments. Modem 204A includes millimeter wave receiver 304 configured to receive data from access point 208. Receiver 304 includes array antenna 308 configured to receive millimeter wave signals in licensed bands such as, for example, 28 GHz, 37 GHz, or 39 GHz band. Receiver 304 performs various signal processing operations on the received data.

According to disclosed embodiments, modem 204A includes transceiver 330 which performs both transmit and receive functions. Transceiver 330 receives data from receiver 308 and processes the data for transmission using the unlicensed shared spectrum such as, for example, 2.4 GHz, 5 GHz or 60 GHz band. Transceiver 330 includes antenna array 334 configured to receive and transmit data in the unlicensed shared spectrum. Transceiver 330 transmits the data via antenna array 334 to client devices 212 and 216.

According to disclosed embodiments, transceiver 330 receives data transmitted by client devices 212 and 216 using the unlicensed shared spectrum. The data is received via antenna array 334. Transceiver processes the received data and transmits the data via antenna array 334 using the unlicensed shared spectrum to access point 208.

Figure 4:
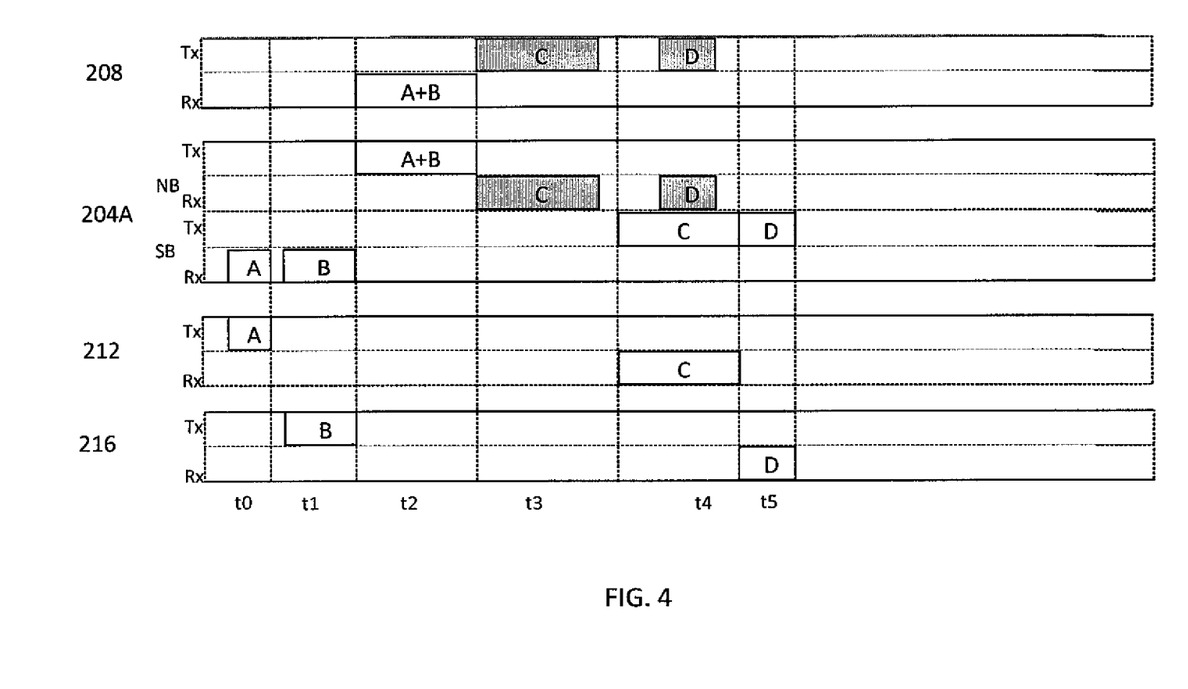
FIGS. 4 and 5 illustrate exemplary data packet transmission and reception in accordance with disclosed embodiments.

FIG. 4 illustrates exemplary data packet transmission and reception on the southbound and northbound links in accordance with some disclosed embodiments. Although in the following description, it is assumed that the southbound links and the northbound uplink between modem 204 and access point 204 rely on 5 GHz unlicensed shared band, in other disclosed embodiments these links may utilize any unlicensed band including 3.5 GHz band and millimeter wave 60 GHz unlicensed band.

Referring to FIG. 4, in time slot $t_0$, communication device 212 transmits data packet A to modem 204A on the 5 GHz unlicensed band which is received by modem 204A on the southbound receive link. In time slot $t_1$, communication device 216 transmits data packet B to modem 204A on the 5 GHz unlicensed band which is received by modem 204A on the southbound receive link. Modem 204A aggregates data packets A and B into a single packet A+B and transmits the data packet A+B to access point 208 on the northbound link using 5 GHz unlicensed band which is received by access point 208 in time slot $t_2$. In other embodiments, modem 204A separately transmits packets A and B to access point 208.

In time slot $t_3$, access point 208 transmits packet C to modem 204A with final destination as communication device 212. Access point 208 transmits packet C to modem 204A using licensed millimeter bands such as 28, 37 or 39 GHz bands. Modem 204A receives packet C using its receiver and antenna array operating at the licensed millimeter band.

In time slot $t_4$, modem 204A transmits packet C to the communication device 212 on the southbound link using 5 GHz unlicensed band which is received by communication device 212 in the same time slot $t_4$. In the same time slot $t_4$, access point 208 transmits packet D to modem 204A with final destination as communication device 216 using licensed millimeter band. Since modem 204A implements a receiver for the licensed millimeter band and a separate transceiver for the unlicensed band, modem 204A can receive packet D on the licensed millimeter band while transmitting packet C to the communication device 212 on the southbound link using 5 GHz unlicensed band. Modem 204A receives packet C using its receiver and antenna array operating at the licensed millimeter band. After receiving packet D in time slot $t_4$, modem 204A transmits this packet to the communication device 216 in time slot $t_5$ on the southbound link using 5 GHz unlicensed band.

Figure 5:
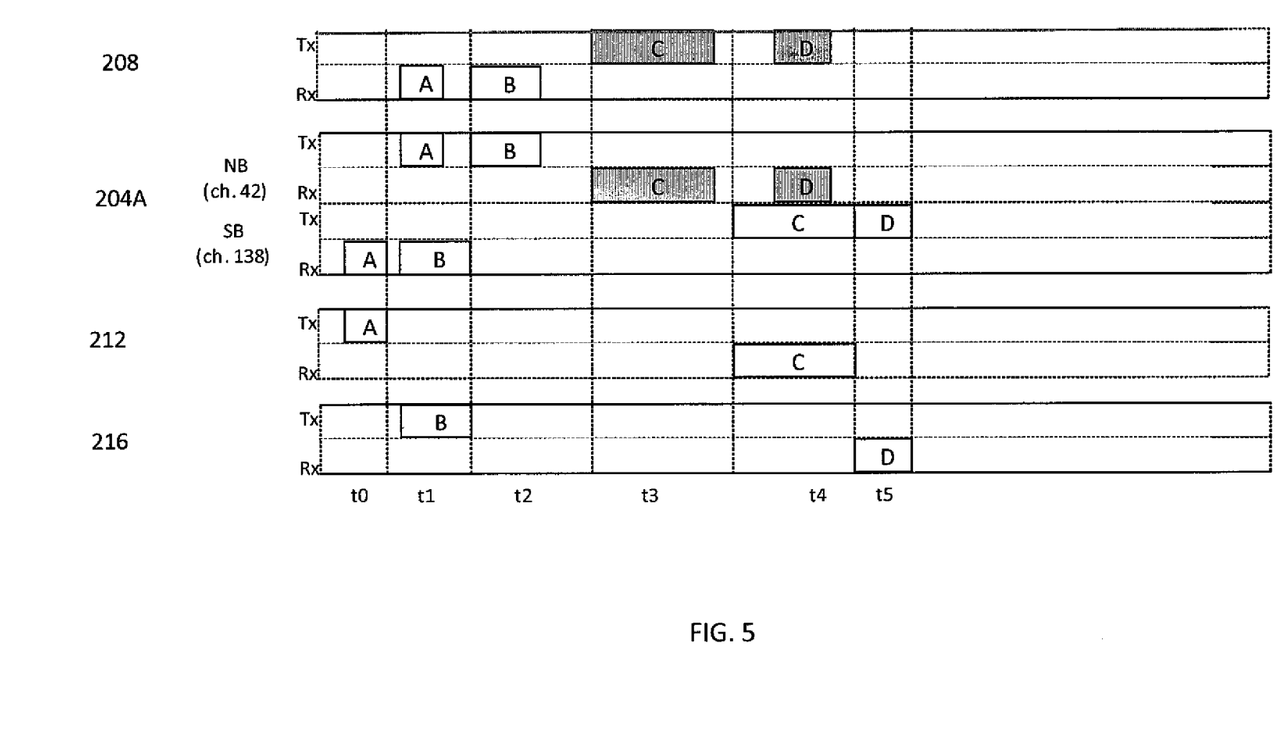

FIG. 5 illustrates another exemplary data packet transmission and reception on the southbound and northbound links in accordance with disclosed embodiments. In this embodiment, modem 204A uses different 80 MHz channels in the 5 GHz unlicensed band for the southbound and the northbound links. In particular, modem 204A uses 80 MHz channel number 42 on the northbound link to access point 208 and 80 MHz channel number 138 on the southbound link to communication devices 212 and 216. Thus, modem 204A can transmit data to access point 208 on the northbound link while receiving data from communication devices 212, 216 on the southbound link.

In time slot $t_0$, communication device 212 transmits data packet A to modem 204A on the 5 GHz unlicensed band 80 MHz channel number 42 which is received by modem 204A on the southbound receive link. In time slot $t_1$, communication device 216 transmits data packet B to modem 204A on the 5 GHz unlicensed band 80 MHz channel number 138 which is received by modem 204A on the southbound receive link. While modem 204A is receiving data packet B on the 5 GHz unlicensed band 80 MHz channel number 138, modem 204A transmits packet A to the access point 208 on the 5 GHz unlicensed band 80 MHz channel number 42. Since modem 204A uses different frequency channels on the northbound and the southbound links, time required for packet transfer between the communication devices and the access point are reduced.

In time slot $t_3$, access point 208 transmits packet C to modem 204A with final destination as communication device 212. Access point 208 transmits packet C to modem 204A using licensed millimeter bands such as 28, 37 or 39 GHz bands. Modem 204A receives packet C using its receiver and antenna array operating at the licensed millimeter band.

In time slot $t_4$, modem 204A transmits packet C to the communication device 212 on the southbound link using 5 GHz license-exempt band which is received by communication device 212 in the same time slot $t_4$. In the same time slot $t_4$, access point 208 transmits packet D to modem 204A with final destination as communication device 216 using licensed millimeter band. Since modem 204A implements a receiver for the licensed millimeter band and a separate transceiver for the unlicensed band, modem 204A can receive packet D on the licensed millimeter bands while transmitting packet C to the communication device 212 on the southbound link using 5 GHz license-exempt band. Modem 204A receives packet C using its receiver and antenna array operating at the licensed millimeter band used by access point 208. After receiving packet D in time slot $t_4$, modem 204A transmits packet D to the communication device 212 in time slot $t_5$ on the southbound link using 5 GHz license-exempt band.

Figure 6:
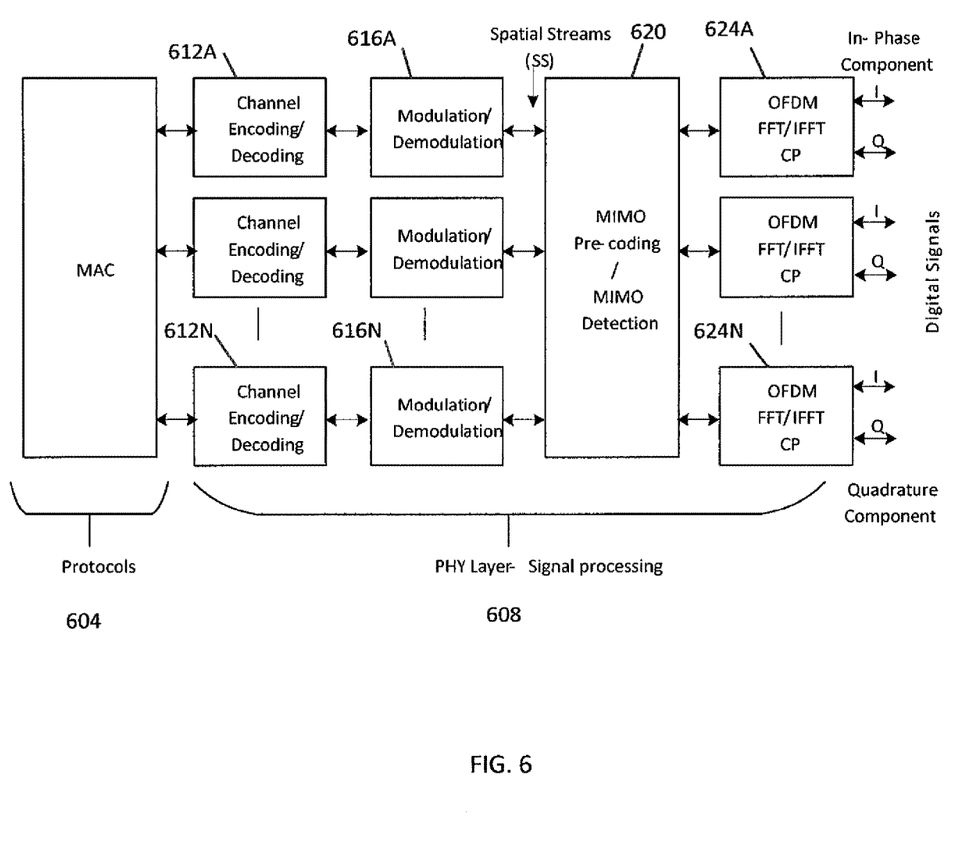
FIGS. 6-8 illustrate wireless communication chains in accordance with disclosed embodiments.

According to disclosed embodiments, modem 204A implements a wireless communication chain for communication on the northbound links, i.e., transmission on license-exempt spectrum and reception on millimeter wave licensed bands. FIG. 6 illustrates medium access control (MAC) 604 and physical layer 608 of a wireless communication chain in accordance with disclosed embodiments. MAC 604 formats data packets to interface with physical layer 608 and provides channel access control protocols to the data packets so that the data packets are delivered to their intended destination in the wireless network. Physical layer 608 may include encoders/decoders 612A-612N for providing channel encoding and decoding scheme to the data packets. The encoding/decoding scheme may, for example, be low density parity check (LDPC) codes. Physical layer 608 may also include modulators/demodulators 616A-616N for providing modulation and demodulation schemes to the data packets. For example, the modulation and demodulation schemes may include BPSK, QPSK, 16-QAM, 64-QAM and 256-QAM. In the transmit direction, modulators/demodulators 616A-616N generate a plurality of spatial streams. Physical layer 608 may also include MIMO precoder/detector 620 for MIMO precoding and detection schemes and may include OFDM 624A-624N for providing multiple access schemes. In the transmit direction, physical layer 608 provides digital baseband In-Phase (I) and Quadrature (Q) signals.

Figure 7:
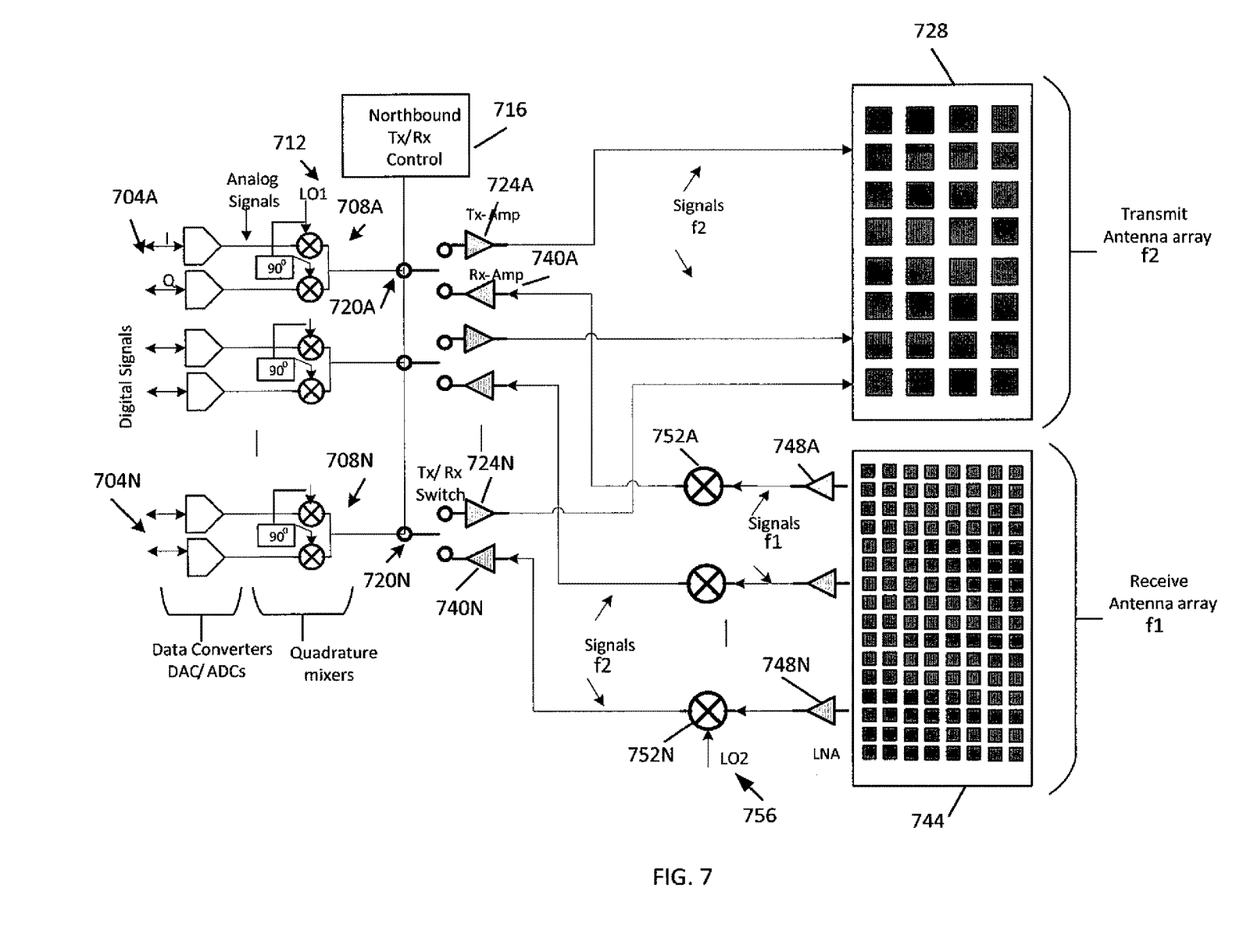

Referring to FIG. 7, in the transmit direction the digital baseband In-Phase (I) and Quadrature (Q) signals are provided to data converters (DAC/ADC) 704A-704N where the signals are converted into analog baseband In-Phase (I) and Quadrature (Q) signals. The analog baseband In-Phase (I) and Quadrature (Q) signals are modulated using quadrature modulators or quadrature mixers 708A-708N driven by Local Oscillator 712 generating a set of signals at frequency $f_2$. A Northbound Tx/Rx control 716 sends a signal to switches 720A-720N to enable connection to transmit amplifiers (Tx-Amp) 724A-724N that amplify the signals. The amplified signals at frequency $f_2$ are then transmitted by antenna array 728 operating at frequency $f_2$.

In the receive direction, in order to receive signals at a second frequency $f_1$ at licensed millimeter wave spectrum such as 28, 37 and 39 GHz bands, Tx/Rx control sends a signal to switches 720A-720N to enable connections to receive amplifiers (Rx-Amp) 740A-740N. The signals received by antenna array 744 operating at frequency $f_1$ in the licensed millimeter wave bands such as, for example, 28, 37 and 39 GHz licensed bands are amplified by low-noise amplifiers (LNAs) 748A-748N. A set of mixers 752A-752N driven by local oscillator (LO2) 756 convert the signals at frequency $f_1$ in the licensed millimeter wave bands to the signals at license-exempt frequency $f_2$.

The down converted signals at frequency $f_2$ are demodulated using a set of quadrature modulators or quadrature mixers 708A-708N driven by Local Oscillator (LO1) generating a set of analog baseband In-Phase (I) and Quadrature (Q) signals. The analog baseband In-Phase (I) and Quadrature (Q) signals are converted to digital baseband In-Phase (I) and Quadrature (Q) signals using data converters (DAC/ADC). These digital baseband In-Phase (I) and Quadrature (Q) signals are fed into physical layer 608 where they undergo digital signal processing. In other embodiments, a direct-conversion receiver that directly demodulates licensed millimeter wave band signals at frequency $f_1$ to the analog baseband In-Phase (I) and Quadrature (Q) signals is implemented.

Figure 8:
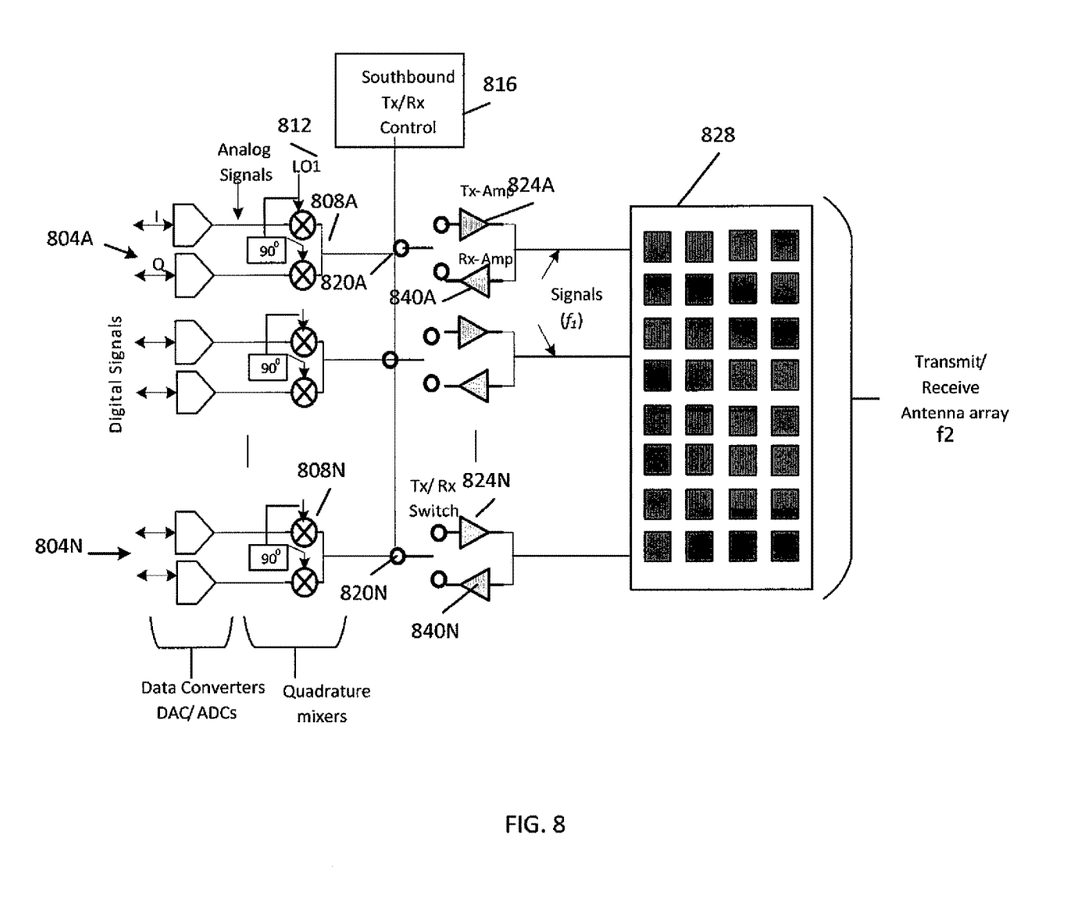

FIG. 8 illustrates a wireless communication chain implemented by modem 204A for communication on the southbound links for transmission and reception on license-exempt spectrum such as, for example, the 5 GHz band. On the southbound links, modem 204A communicates with the communication devices 212 and 216. In the transmit direction, physical layer 608 (illustrated in FIG. 6) provides the digital baseband In-Phase (I) and Quadrature (Q) signals that are converted to analog baseband In-Phase (I) and Quadrature (Q) signals using data converters (ADC/DAC) 804A-804N. The analog baseband In-Phase (I) and Quadrature (Q) signals are modulated using quadrature modulators or quadrature mixers 808A-808N driven by a Oscillator (LO1) 812 generating a set of signals at license-exempt spectrum frequency $f_2$. A Tx/Rx control 816 sends a signal to switches 820A-820N to enable connection to transmit amplifiers (Tx-Amp) 824A-824N that amplify the signals. These amplified signals are then transmitted by antenna array 828 operating at the license-exempt spectrum frequency $f_2$.

To receive signals in the receive direction at license-exempt spectrum frequency $f_2$, Tx/Rx control 816 sends a signal to switches 820A-820N to enable connections to receive amplifiers (Rx-Amp) 840A-840N. These received signals at the license-exempt spectrum frequency $f_2$ are amplified by amplifiers (Rx-Amp) 840A-840N and demodulated using quadrature modulators or quadrature mixers 808A-808N driven by Local Oscillator (LO1) 812 enerating a set of analog baseband In-Phase (I) and Quadrature (Q) signals. The analog baseband In-Phase (I) and Quadrature (Q) signals are converted to digital baseband In-Phase (I) and Quadrature (Q) signals using a set of data converters (ADC/DAC) 804A-804N. The digital baseband In-Phase (I) and Quadrature (Q) signals are fed into physical (PHY) layer (shown in FIG. 6) where they undergo digital signal processing.

Figure 9:
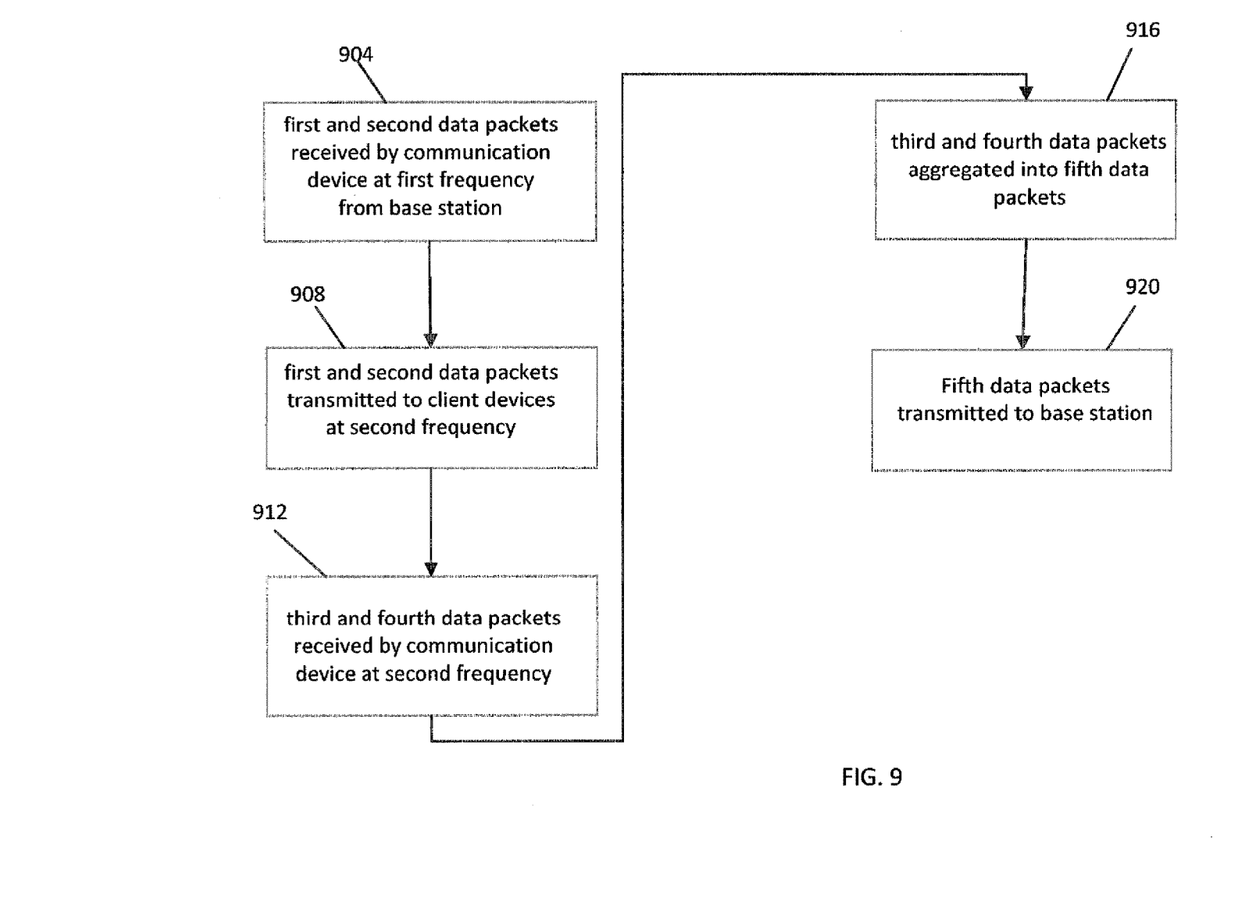
FIG. 9 is a flow diagram of a method of providing wireless broadband link in accordance with some disclosed embodiments.

FIG. 9 is a flow diagram of a method of providing wireless broadband link between a base station and a plurality of client devices in accordance with some disclosed embodiments. In step 904, first and second data packets are received at a first frequency by communication device 204A. The first and second data packets are transmitted by base station 208.

In step 908, communication device 204A transmits at a second frequency the first data packets to client device 212 and the second data packets to client device 216. In step 912, communication device 204A receives at the second frequency third and fourth data packets from first and second client devices, 212 and 216, respectively.

In step 916, communication device 204A aggregates the third and fourth data packets into fifth data packets. In step 920, communication device 204A transmits the fifth data packets at the second frequency to base station 208.

Those skilled in the art will recognize that, for simplicity and clarity, the full structure and operation of all systems suitable for use with the present disclosure is not being depicted or described herein. Instead, only so much of systems as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

Those skilled in the art to which this application relates will appreciate that other and further additions, deletions, substitutions and modifications may be made to the described embodiments.

What is claimed is:

1. A wireless broadband device for providing wireless broadband link between a base station and a plurality of client devices in a wireless communication network, comprising:
    a receiver configured to operate at a millimeter wave band to receive a first data packet in a first time interval and receive a second data packet in a second time interval from the base station;
    a transceiver configured to operate at a second frequency band and operable to transmit the first data packet to a first client device in a third time interval and to transmit the second data packets to a second client device in a fourth time interval, the millimeter wave band having at least a 2 GHz separation from the second frequency band;
    the transceiver configured to receive a third data packets from the first client device in a fifth time interval and receive a fourth data packet from the second client device in a sixth time interval;
    the transceiver operable to transmit the third data packet in a seventh time interval to the base station and transmit the fourth data packet in an eighth time interval to the base station,
    wherein at least one of the time intervals for transmitting the data packets overlaps with at least one of the time intervals for receiving the data packets.

2. The wireless broadband device of claim 1, wherein the transceiver aggregates the third and fourth data packets and transmits the aggregated data packets to the base station.

3. The wireless broadband device of claim 1, wherein the first client device is a user equipment (UE).

4. The wireless broadband device of claim 1, wherein the second client device is a laptop computer.

5. The wireless broadband device of claim 1, wherein the first client device is a desktop computer.

6. The wireless broadband device of claim 1, wherein the receiver comprises a first antenna array configured to receive signals at a millimeter wave band.

7. The communication device of claim 1, wherein the transceiver comprises a second antenna array configured to receive and transmit signals at sub-7 GHz frequency band.

8. The wireless broadband device of claim 1, further comprising:
    a medium access control (MAC) configured to format the data packets to interface with a physical layer and to provide channel access control protocols to enable the data packets to be delivered to their respective intended destinations; and
    the physical layer connected to the MAC, the physical layer configured to process the data packets to generate digital baseband In-Phase (I) and Quadrature (Q) signals.

9. The wireless broadband device of claim 1, wherein the transceiver further comprises:
    a plurality of digital to analog converters configured to convert the digital baseband in-phase (I) and quadrature (Q) signals to analog baseband in-phase (I) and quadrature (Q) signals;
    a plurality of quadrature modulators driven by a local oscillator, and wherein the modulators are configured to modulate the analog baseband in-phase (I) and quadrature (Q) signals; and
    a plurality of transmit amplifiers operable to amplify the modulated analog baseband in-phase (I) and quadrature (Q) signals.

10. The wireless broadband device of claim 9, wherein the amplified signals are transmitted by the second antenna array.

11. The wireless broadband device of claim 1, wherein the receiver further comprises:
    a plurality of receive amplifiers operable to amplify the received signals;
    a plurality of quadrature modulators driven by a local oscillator, wherein the modulators are configured to modulate the amplified signals and to generate analog baseband in-phase (I) and quadrature (Q) signals; and
    a plurality of analog to digital converters configured to convert the analog baseband in-phase (I) and quadrature (Q) signals to digital baseband in-phase (I) and quadrature (Q) signals,
    wherein the digital baseband in-phase (I) and quadrature (Q) signals are applied to the physical layer for digital signal processing.

12. A wireless broadband device for providing wireless broadband link between a base station and at least one client device in a wireless communication network, comprising:
    a receiver configured to operate at a millimeter wave frequency band and to receive a first data packet in a first time interval from the base station;
    a transceiver configured to operate at a second frequency band and operable to transmit the first data packet in a second time interval to a client device, the millimeter wave frequency band having at least a 2 GHz separation from the second frequency band;
    the transceiver configured to receive a second data packet in a third time interval from the client device, the transceiver operable to transmit the second data packet in a fourth time intervals to the base station,
    wherein at least one of the time intervals for transmitting the data packets overlaps with at least one of the time intervals for receiving the data packets.

13. The wireless broadband device of claim 12, wherein the client device is a user equipment (UE).

14. The wireless broadband device of claim 12, wherein the client device is a laptop computer.

15. The wireless broadband device of claim 12, wherein the client device is a desktop computer.

16. The wireless broadband device of claim 12, wherein the receiver comprises a first antenna array configured to receive signals at a millimeter wave band.

17. The wireless broadband device of claim 12, wherein the transceiver comprises a second antenna array configured to receive and transmit signals at sub-7 GHz band.

18. The wireless broadband device of claim 12, further comprising:
    a medium access control (MAC) configured to format the data packets to interface with a physical layer and to provide channel access control protocols to enable the data packets to be delivered to their respective intended destinations; and
    the physical layer connected to the MAC, the physical layer configured to process the data packets to generate digital baseband In-Phase (I) and Quadrature (Q) signals.

19. The wireless broadband device of claim 12, wherein the transceiver further comprises:

a plurality of digital to analog converters configured to convert the digital baseband in-phase (I) and quadrature (Q) signals to analog baseband in-phase (I) and quadrature (Q) signals;

a plurality of quadrature modulators driven by a local oscillator, and wherein the modulators are configured to modulate the analog baseband in-phase (I) and quadrature (Q) signals; and a plurality of transmit amplifiers operable to amplify the modulated analog baseband in-phase (I) and quadrature (Q) signals.

20. The wireless broadband device of claim 19, wherein the amplified signals are transmitted by the second antenna array.

21. The wireless broadband device of claim 12, wherein the receiver further comprises:

a plurality of receive amplifiers operable to amplify the received signals;

a plurality of quadrature modulators driven by a local oscillator, wherein the modulators are configured to modulate the amplified signals and to generate analog baseband in-phase (I) and quadrature (Q) signals; and a plurality of analog to digital converters configured to convert the analog baseband in-phase (I) and quadrature (Q) signals to digital baseband in-phase (I) and quadrature (Q) signals, wherein the digital baseband in-phase (I) and quadrature (Q) signals are applied to the physical layer for digital signal processing.

22. A method of providing wireless broadband link between a base station and a plurality of client devices in a wireless communication network, comprising:

receiving by a wireless broadband device at a millimeter wave band a first data packet in a first time interval and a second data packet in a second time interval from the base station;

transmitting by the wireless broadband device at a second frequency the first data packet to a first client device in a third time interval and the second data packets to a second client device in a fourth time interval, the millimeter wave band having at least a 2 GHz separation from the second frequency band;

receiving by the wireless broadband device at the second frequency band a third data packet from the first client device in a fifth time interval and a fourth data packet from the second client device in a sixth time interval;

transmitting by the wireless broadband device the third packet in a seventh time interval to the base station at the second frequency band and transmitting the fourth data packet in an eighth time interval to the base station at the second frequency band, wherein at least one of the time intervals for transmitting the data packets overlaps with at least one of the time intervals for receiving the data packets.

23. The method of claim 22, wherein the wireless broadband device is a wireless broadband modem.

24. The method of claim 22, wherein the first client device is a user equipment (UE).

25. The method of claim 22, wherein the second client device is a laptop computer.

26. The method of claim 22, wherein the first client device is a desktop computer.

27. A method of providing wireless broadband link between a base station and at least one client device in a wireless communication network, comprising:

receiving in a first time interval by a wireless broadband device at a millimeter wave band a first data packet from the base station;

transmitting in a second time interval by the wireless broadband device at the second frequency band the first data packet to a client device, the millimeter wave band and second frequency band having at least a 2 GHz separation;

receiving in a third time interval by the wireless broadband device at the second frequency band a second data packets from the client device; and transmitting in a fourth time interval by the wireless broadband device the second data packets at the second frequency band to the base station, wherein at least one of the time intervals for transmitting the data packets overlaps with at least one of the time intervals for receiving the data packets.

28. The method of claim 27, wherein the wireless broadband device is a broadband modem.

29. A method of providing wireless broadband link between a base station and at least one client device in a wireless communication network, comprising:

receiving in a first time interval by a wireless broadband device at a first frequency band a first data packet from the client device;

transmitting in a second time interval by the wireless broadband device at the first frequency band the first data packet to the base station, receiving in a third time interval by the wireless broadband device at a millimeter wave band a second data packet from the base station, the millimeter wave band and first frequency band having at least a 2 GHz separation; and transmitting in a fourth time interval by the wireless broadband device the second data packet at the first frequency band to the client device, wherein at least one of the time intervals for transmitting data packet overlaps with at least one of the time intervals for receiving data packet.

30. A method of providing wireless broadband link between a base station and at least a first and a second client device in a wireless communication network, comprising:

receiving in a first time interval by a wireless broadband device at a first frequency band a first data packet from the first client device;

transmitting in a second time interval by the wireless broadband device at the first frequency band the first data packet to the base station, receiving in a third time interval by the wireless broadband device at a first frequency band a second data packet from the second client device;

transmitting in a fourth time interval by the wireless broadband device at the first frequency band the second data packet to the base station, receiving in a fifth time interval by the wireless broadband device at a millimeter wave band a third data packet from the base station, the millimeter wave band and first frequency band having at least a 2 GHz separation;

transmitting in a sixth time interval by the wireless broadband device the third data packet at the first frequency band to the first client device, wherein at least one of the time intervals for transmitting the data packet overlaps with at least one of the time intervals for receiving the data packet.

* * * * *